UNITED STATES PATENT OFFICE 2,061,127

COATED FABRIC

Alfonso M. Alvarado, Robert B. Flint, and Leo Phillip Hubbuch, Wilmington, Del., assignors to E. I. du Pont de Nemours & Company, Wilmington, Del., a corporation of Delaware No Drawing. Application April 26, 1934,
Serial No. 722,502

13 Claims. (Cl. 91—68)

This invention relates to a new type of coated or impregnated fabric, and more particularly to fabrics coated or impregnated with compositions comprising hydrogenated rubber.

This invention has as an object the preparation of new types of coated or impregnated fabrics comprising fabric which has been coated or impregnated with hydrogenated rubber alone or in combination with cellulose derivatives with or without a softening agent. A further object is the preparation of new cellulose derivative compositions. Other objects will appear hereinafter.

These objects are accomplished by the following invention wherein a fabric is coated and/or impregnated with a composition containing hydrogenated rubber or hydrogenated rubber and a cellulose derivative with or without the usual agents such as pigments, fillers, softeners, and the like.

Suitable jellies for coating cloth or fabric can be prepared from hydrogenated rubber with nitrocellulose, ethyl cellulose, benzyl cellulose, and cellulose acetate by use of proper solvent mixtures. Especially good results are obtained when a softener such as dibutyl phthalate is incorporated with the mixture of hydrogenated rubber and the cellulose derivative.

The range of solvent mixtures common to both hydrogenated rubber and the different cellulose derivatives has been found to be especially narrow and specific. The following table gives solvent compositions which are suitable for use with hydrogenated rubber and the various cellulose derivatives:

| Cellulose derivative | Benzene | 1,2-dimethoxy-ethane | Gasoline |
|---|---|---|---|
|  | Per cent | Per cent | Per cent |
| Nitrocellulose | 58.9 | 31.8 | 9.3 |
| Ethyl cellulose | 55.5 | 30.0 | 14.5 |
| Benzyl cellulose | 55.5 | 30.0 | 14.5 |

For cellulose acetate the following composition was found most suitable:

|  | Per cent |
|---|---|
| Chloroform | 80.0 |
| Ethylene dichloride | 16.0 |
| Ethyl alcohol | 4.0 |

The proportions of the different ingredients in these solvent mixtures may be varied about 2% from the values listed in this table before distinct incompatibility of the jelly results.

Using the above solvent compositions the following jellies were prepared and cloth was coated or impregnated with these jellies:

Jelly compositions

| Jelly No. | Jelly | Per cent ingredient |
|---|---|---|
| 1 | Nitrocellulose | 4.8 |
|  | Hydrogenated rubber | 14.4 |
|  | Solvent mixture | 80.7 |
| 2 | Nitrocellulose | 9. |
|  | Hydrogenated rubber | 3.0 |
|  | Solvent mixture | 88.0 |
| 3 | Nitrocellulose | 7.8 |
|  | Hydrogenated rubber | 7.8 |
|  | Dibutyl phthalate | 3.9 |
|  | Solvent mixture | 80.5 |
| 4 | Ethyl cellulose | 4.7 |
|  | Hydrogenated rubber | 14.0 |
|  | Solvent mixture | 81.3 |
| 5 | Ethyl cellulose | 8.9 |
|  | Hydrogenated rubber | 3.0 |
|  | Solvent mixture | 88.1 |
| 6 | Ethyl cellulose | 7.7 |
|  | Hydrogenated rubber | 7.7 |
|  | Dibutyl phthalate | 3.9 |
|  | Solvent mixture | 80.7 |
| 7 | Benzyl cellulose | 5.4 |
|  | Hydrogenated rubber | 16.2 |
|  | Solvent mixture | 78.4 |
| 8 | Benzyl cellulose | 15.2 |
|  | Hydrogenated rubber | 5.1 |
|  | Solvent mixture | 79.7 |
| 9 | Benzyl cellulose | 10.0 |
|  | Hydrogenated rubber | 10.0 |
|  | Dibutyl phthalate | 5.0 |
|  | Solvent mixture | 75.0 |

| Jelly No. | Jelly | Per cent ingredient |
|---|---|---|
| 10 | Cellulose acetate | 3.8 |
| | Hydrogenated rubber | 11.5 |
| | Solvent mixture | 84.7 |
| 11 | Cellulose acetate | 9.9 |
| | Hydrogenated rubber | 3.3 |
| | Solvent mixture | 86.8 |
| 12 | Cellulose acetate | 6.9 |
| | Hydrogenated rubber | 6.9 |
| | Chlorinated diphenyl (about 58% chlorine) | 3.4 |
| | Solvent mixture | 82.8 |
| 13 | Hydrogenated rubber | 23.1 |
| | Solvent mixture | 76.9 |
| 14 | Hydrogenated rubber | 30.0 |
| | Paraffin wax | 3.3 |
| | Solvent mixture | 66.7 |
| 15 | Hydrogenated rubber | 30.0 |
| | Dibutyl phthalate | 3.3 |
| | Solvent mixture | 66.7 |

In all cases, because the final solvent mixture is very lean for both solid constituents, it is advantageous to dissolve the cellulose derivative and hydrogenated rubber in their respective active solvents followed by thinning.

Other solvent mixtures which may be used with hydrogenated rubber and ethyl, benzyl, and nitrocellulose include the following:

Benzene 25.5% + ethyl acetate 74.5%
Toluene 27.5% + ethyl acetate 72.5%
Gasoline 52.5% + ethyl acetate 47.5%
Benzene 65.0% + 1,2-dimethoxyethane 35.0%
Toluene 65.0% + 1,2-dimethoxyethane 35.0%
Toluene 87.0% + B-methoxythanol 13.0%

The proportions of the different ingredients in these solvent mixtures may be varied about 2% from the values listed before distinct incompatibility of the jelly results.

The various jellies containing different mixtures of hydrogenated rubber with cellulose derivatives were coated on cloth by the doctor knife process. In this process, the cloth under tension is drawn against the edge of the blade of the doctor knife. The jelly is flowed in front of the knife blade; it adheres to the cloth and is carried under the knife blade which removes all but a thin layer of the jelly. The coated cloth is then dried. This operation is repeated until the proper weight and thickness of coating are obtained, which in turn depends on the use for which the product is designed. Other methods well known to those skilled in the art of coating cloth may be used to produce a flexible water-proof fabric.

Coatings of hydrogenated rubber alone are tacky and though not strong, they may be used for their adhesive action or may be rendered tack-free by use of waxes, pigments, or fillers, including as tack removing agents, talc, soapstone, mica, etc. The tacky coated fabrics are admirably suited for use as adhesive tape, and electrical insulation tape, whereas the non-tacky coated fabrics can be used as material for shower curtains, window shades, and washable table cloths.

In general the coatings from mixtures of hydrogenated rubber and cellulose derivatives may be of two types, (1) a dull finish coating comprising only the mixture of hydrogenated rubber and a cellulose derivative, and (2) a glossy finish coating comprising a mixture of hydrogenated rubber with a cellulose derivative and a blending softener which is mutually soluble in both the hydrogenated rubber and the cellulose derivative. Softeners of this type which are suitable for mixtures of hydrogenated rubber and such cellulose derivatives as nitrocellulose, ethyl cellulose, and benzyl cellulose are dibutyl phthalate, dibutyl adipate, diamyl succinate, dicyclohexyl phthalate, cyclohexyl butyl adipate, butyl benzoylbenzoate, and dibutyl stearamide. For mixtures of hydrogenated rubber and cellulose derivatives such as cellulose acetate, cellulose propionate, and cellulose butyrate, the chlorinated hydrocarbons, such as chlorinated diphenyls and chlorinated naphthalenes containing 45% to 65% combined chlorine by weight are satisfactory. Coatings of the first type, though not strong, are useful especially where a dull finish coat is desired or where strength of the coating is immaterial to the quality of the coated fabric. Coatings of the second type are applicable for general use inasmuch as they are quite strong.

Other cellulose derivatives which may be used in the process of this invention include cellulose propionate, cellulose butyrate, crotyl cellulose, mixed cellulose derivatives such as cellulose nitroacetate, cellulose acetopropionate, etc. Plasticizers and blending softeners other than dibutyl phthalate such as aryl phosphates, diamyl phthalate, or other alkyl phthalates, aryl phthalates and alicyclic phthalates such as dicyclohexyl phthalate, alkyl and aryl succinates and adipates such as dibutyl adipate and dibenzyl succinate, and in addition such plasticizers as dibutyl stearamide and butyl benzoylbenzoate may be used.

Solvents or mixtures of solvents in which hydrogenated rubber and the cellulose derivatives are mutually soluble other than those mentioned may be employed.

Pigments, such as lithopone, graphite, lamp black, iron oxide, zinc oxide, white lead, titanium dioxide, and Prussian blue; natural resins or gums such as Congo, damar, kauri, rosin, ester gum, asphalt and the like; synthetic resins, such as certain of the phenol-formaldehyde, certain of the polyhydric alcohol-polybasic acid resins, certain of the vinyl-type resins, and the like, particularly those of a strong hydrocarbon nature, may be incorporated in the hydrogenated rubber-cellulose derivative compositions, although the compatibility of some of the compositions containing resins is not high.

Rubber in varying degrees of hydrogenation may be used, although it is preferable to use completely hydrogenated rubber due to its preferred aging qualities.

Coated cloth or fabric prepared according to this invention may be used as water-proof cloth for a variety of purposes such as hospital sheeting, washable window shades, shower curtain material, material for ornamental screens, and the like.

An outstanding advantage of the use of compositions containing hydrogenated rubber is their excellent aging characteristics as compared with similar compositions containing rubber. These latter when coated or impregnated in cloth become stiff and lose their flexibility in a relatively short time. On the other hand, the compositions containing hydrogenated rubber maintain their flexibility for long periods of time under rigorous aging conditions.

The advantageous aging characteristics of hydrogenated rubber compositions in comparison with similar compositions prepared from rubber are aptly illustrated by the following table:

| Composition | * Per cent decrease in strength Fadeometer oven 65° C. | | Per cent increase in stiffness Fadeometer oven 65° C. | |
|---|---|---|---|---|
| | (300 hours) | (12 weeks) | (300 hours) | (12 weeks) |
| Titanium dioxide-barium sulfate pigment _____ 37.5<br>Hydrogenated rubber _____ 56.2<br>Ethyl cellulose _____ 6.3 | +26 | +7 | +26 | −11 |
| Titanium dixoide-barium sulfate pigment _____ 37.5<br>Pale crepe rubber _____ 62.5 | +40 | +58 | +317 | +278 |
| Titanium dioxide-barium sulfate pigment _____ 37.5<br>Pale crepe rubber _____ 25.0<br>Ethyl cellulose _____ 25.0<br>Dibutyl phthalate _____ 12.5 | +24 | +37 | +283 | +262 |

* Per cent decrease in strength represents decrease in both tensile and tearing strength.

In these experiments, jellies consisting of the above compositions dispersed in solvents were coated on both sides of a cloth sheeting using the doctor knife process described above. The coated fabric was dried. The dry weight was about 30 g. per square yard on each side of the fabric. These coated fabrics were subjected to exposure tests and changes in strength and stiffness determined.

The above description and examples are intended to be illustrative only. Any modification of or variation therefrom which conforms to the spirit of the invention is intended to be included within the scope of the claims.

We claim:

1. A fabric coated with a composition comprising hydrogenated rubber and a cellulose derivative.

2. A fabric coated with a composition comprising hydrogenated rubber, a celulose derivative, and a blending softener.

3. A fabric coated with a composition comprising hydrogenated rubber and a cellulose ether.

4. A fabric coated with a composition comprising hydrogenated rubber, a cellulose ether, and a blending softener.

5. A fabric coated with a composition comprising hydrogenated rubber and ethyl cellulose.

6. A fabric coated with a composition comprising hydrogenated rubber, ethyl cellulose, and a blending softener.

7. A fabric coated with a composition comprising hydrogenated rubber, ethyl cellulose, and an alkyl phthalate.

8. A fabric coated with a composition comprising hydrogenated rubber, ethyl cellulose, and dibutyl phthalate.

9. A fabric coated with a composition comprising hydrogenated rubber and a cellulose ester.

10. A fabric coated with a composition comprising hydrogenated rubber, a cellulose ester, and a blending softener.

11. A fabric coated with a composition comprising hydrogenated rubber and cellulose acetate.

12. A fabric coated with a composition comprising hydrogenated rubber, cellulose acetate, and a blending softener.

13. A fabric coated with a composition comprising hydrogenated rubber, cellulose acetate, and a chlorinated diphenyl containing about 55% combined chlorine.

ALFONSO M. ALVARADO.
ROBERT B. FLINT.
LEO PHILLIP HUBBUCH.

CERTIFICATE OF CORRECTION.

Patent No. 2,061,127.

November 17, 193[?]

ALFONSO M. ALVARADO, ET AL.

It is hereby certified that error appears in the printed specification of the above numbered patent requiring correction as follows: Page 1, second column, line 22, in the table, for the indistinct numeral at the end of the line read 80.8; page 2, first column, line 37, for "B-methoxythanol" read B-methoxyethanol; and that the said Letters Patent should be read with these corrections therein that the same may conform to the record of the case in the Patent Office.

Signed and sealed this 9th day of March, A. D. 1937.

Henry Van Arsdale
Acting Commissioner of Patents.

(Seal)